US012666091B2

(12) United States Patent
Feng et al.

(10) Patent No.: US 12,666,091 B2
(45) Date of Patent: Jun. 23, 2026

(54) UNMANNED AERIAL VEHICLE-BASED LIVE VIDEO STREAMING METHOD AND SYSTEM, DEVICE, AND STORAGE MEDIUM

(71) Applicant: AUTEL ROBOTICS CO., LTD., Shenzhen (CN)

(72) Inventors: Yinhua Feng, Shenzhen (CN); Jie Leng, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 167 days.

(21) Appl. No.: 18/599,345

(22) Filed: Mar. 8, 2024

(65) Prior Publication Data

US 2025/0254369 A1    Aug. 7, 2025

Related U.S. Application Data

(63) Continuation of application No. PCT/CN2022/117900, filed on Sep. 6, 2022.

(51) Int. Cl.
| | |
|---|---|
| *H04N 21/2187* | (2011.01) |
| *H04L 65/65* | (2022.01) |
| *H04L 67/02* | (2022.01) |
| *H04N 21/234* | (2011.01) |
| *H04N 21/2662* | (2011.01) |

(52) U.S. Cl.
CPC ......... *H04N 21/2187* (2013.01); *H04L 65/65* (2022.05); *H04L 67/02* (2013.01); *H04N 21/23406* (2013.01); *H04N 21/2662* (2013.01)

(58) Field of Classification Search
CPC ......... H04N 21/2187; H04N 21/23406; H04N 21/2662; H04N 21/64738; H04N 21/4223; H04L 65/65; H04L 67/02; H04L 65/1108; H04L 65/60
See application file for complete search history.

(56) References Cited

U.S. PATENT DOCUMENTS

| | | | |
|---|---|---|---|
| 11,100,197 B1 | 8/2021 | Bernardi | |
| 12,101,519 B1 * | 9/2024 | Washburn | ............ H04N 21/643 |

(Continued)

FOREIGN PATENT DOCUMENTS

| | | |
|---|---|---|
| CN | 104244108 A | 12/2014 |
| CN | 104253814 A | 12/2014 |

(Continued)

OTHER PUBLICATIONS

International Search Report mailed Nov. 9, 2022; PCT/CN2022/117900 with English Translation.

(Continued)

*Primary Examiner* — Alazar Tilahun
(74) *Attorney, Agent, or Firm* — Frank Gao, Esq.

(57) ABSTRACT

Disclosed in embodiments of the present disclosure are an unmanned aerial vehicle-based live video streaming method and system, a device, and a storage medium. The method includes: acquiring original video stream data sent by an unmanned aerial vehicle; encoding/decoding the original video stream data to obtain output buffer data; converting the output buffer data into video frames supported by the WebRtc protocol; and sending the video frames to a preset server through a WebRtc transmission channel, so that the preset server performs live streaming display according to the video frames.

20 Claims, 4 Drawing Sheets

(56)                 References Cited

U.S. PATENT DOCUMENTS

| | | |
|---|---|---|
| 2015/0135236 A1 | 5/2015 | Rivera |
| 2016/0241620 A1* | 8/2016 | Zhu ........................ H04W 40/18 |
| 2017/0251042 A1* | 8/2017 | Bae ........................ H04L 65/764 |
| 2018/0048694 A1* | 2/2018 | Einarsson ............. H04L 65/612 |
| 2018/0152736 A1* | 5/2018 | Alexander ......... H04N 21/6587 |
| 2021/0120292 A1* | 4/2021 | Liu ........................ H04N 17/00 |

FOREIGN PATENT DOCUMENTS

| | | |
|---|---|---|
| CN | 106209949 A | 12/2016 |
| CN | 108206833 A | 6/2018 |
| CN | 108319629 A | 7/2018 |
| CN | 109587510 A | 4/2019 |
| CN | 109862386 A | 6/2019 |
| CN | 110830777 A | 2/2020 |
| CN | 111386708 A | 7/2020 |
| CN | 111901630 A | 11/2020 |
| CN | 112788050 A | 5/2021 |
| CN | 113747191 A | 12/2021 |

OTHER PUBLICATIONS

The First Chinese Office action dated Nov. 30, 2023; Appln. No. 202111061182.X with English Translation.

\* cited by examiner

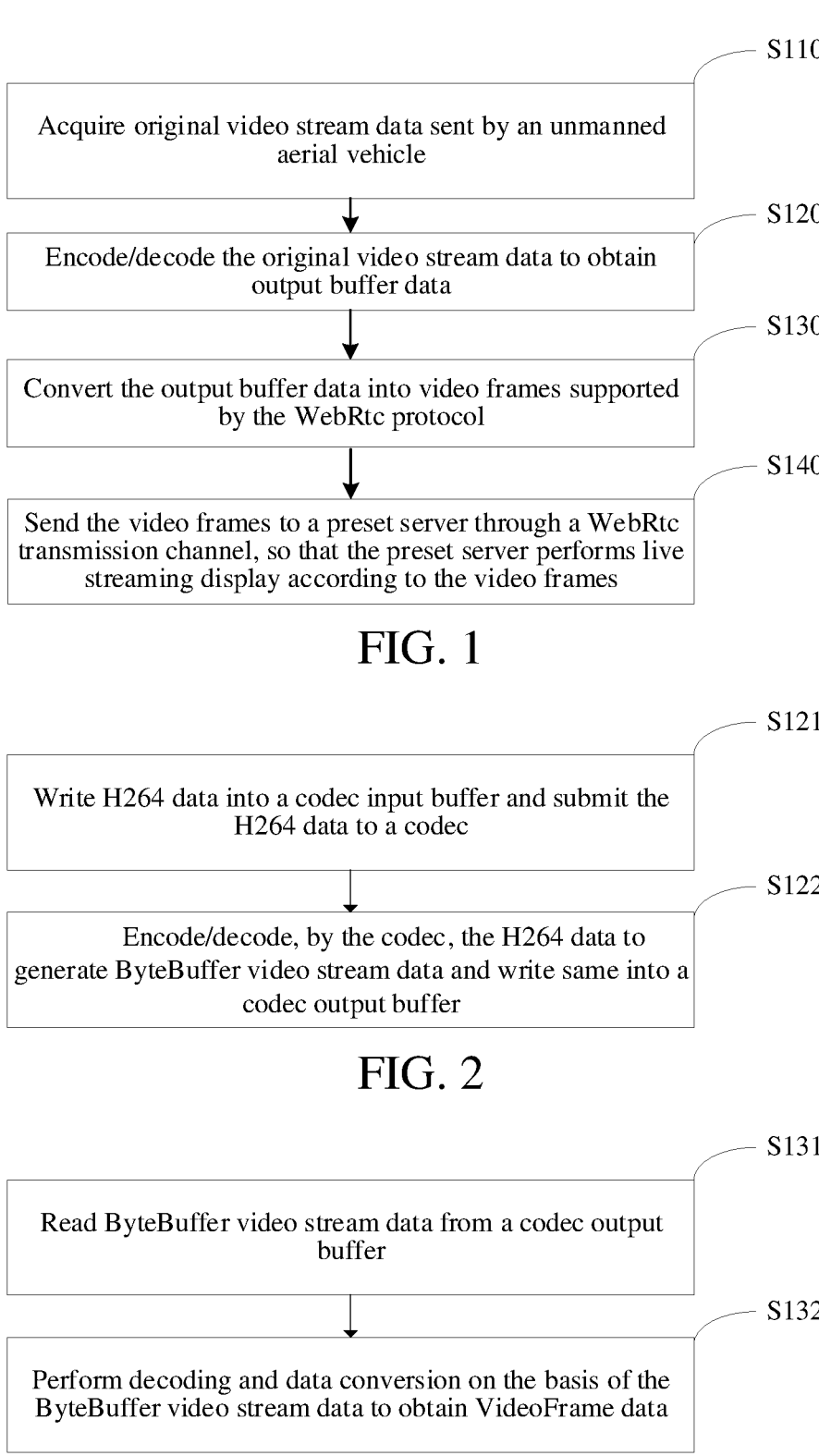

S110

Acquire original video stream data sent by an unmanned aerial vehicle

S120

Encode/decode the original video stream data to obtain output buffer data

S130

Convert the output buffer data into video frames supported by the WebRtc protocol

S140

Send the video frames to a preset server through a WebRtc transmission channel, so that the preset server performs live streaming display according to the video frames

Write H264 data into a codec input buffer and submit the H264 data to a codec

S122

Encode/decode, by the codec, the H264 data to generate ByteBuffer video stream data and write same into a codec output buffer

Read ByteBuffer video stream data from a codec output buffer

S132

Perform decoding and data conversion on the basis of the ByteBuffer video stream data to obtain VideoFrame data

FIG. 3

UNMANNED AERIAL VEHICLE-BASED LIVE VIDEO STREAMING METHOD AND SYSTEM, DEVICE, AND STORAGE MEDIUM

CROSS-REFERENCE TO RELATED APPLICATIONS

This application is a Continuation Application of the International Application No. PCT/CN2022//117900 file on Sep. 8, 2022, which claims priority to Chinese Patent Application No. 202111061182.X, entitled "UNMANNED AERIAL VEHICLE-BASED LIVE VIDEO STREAMING METHOD AND SYSTEM, DEVICE, AND STORAGE MEDIUM" and filed with the National Intellectual Property Administration, PRC on Sep. 10, 2021, which is incorporated herein by reference in its entirety.

BACKGROUND

With the development of unmanned aerial vehicle technologies, the unmanned aerial vehicle technologies have wider and wider application scenarios, and play huge roles in power line inspection, traffic rescue, customs and border defense and other scenarios. However, the expansion of the application scenario puts forward higher requirements for the performance of unmanned aerial vehicles. For example, for tasks that require unmanned aerial vehicles to transmit live streaming pictures in real time, due to operating characteristics and operating environments of unmanned aerial vehicles, the live streaming delay is often very high, thus affecting completion of the tasks.

For current unmanned aerial vehicle systems, in application scenarios that require live streaming, there are two main live streaming methods: one is to put a client used for watching live streaming and an unmanned aerial vehicle in a same network, in which case, however, only the client in the network can watch live streaming and the method usually uses video transmission of hls, hlv and other similar protocols, which has poor real-time performance and high delay. The other is to send an original video captured by an unmanned aerial vehicle to a terminal device in which live streaming software has been installed, so as to implement live streaming through the terminal device. However, during live streaming, live streaming software usually uses a TCP as a transport layer protocol, in which case once packet loss occurs, all subsequent packets will be buffered, thus causing lagging and delay of live streaming, such that accidents are prone to happen when unmanned aerial vehicle flight requires real-time control. Therefore, a novel unmanned aerial vehicle-based live streaming method is needed to ensure that unmanned aerial vehicle-based live streaming pictures have low delay and are not prone to lagging.

SUMMARY

The present disclosure relates to the field of unmanned aerial vehicle data transmission technologies, and in particular, to an unmanned aerial vehicle-based live video streaming method and system, a device, and a storage medium. With this regard, the present disclosure provides an unmanned aerial vehicle-based live video streaming method and system, a device, and a storage medium, for use in implementing unmanned aerial vehicle-based live video streaming through the WebRtc protocol to reduce live streaming delay and avoid lagging.

To solve the above technical problems, the present disclosure uses the following technical solutions.

According to the first aspect, the present disclosure provides an unmanned aerial vehicle-based live video streaming method, the method including:

acquiring original video stream data sent by an unmanned aerial vehicle;

encoding/decoding the original video stream data to obtain output buffer data;

converting the output buffer data into video frames supported by the WebRtc protocol; and sending the video frames to a preset server through a WebRtc transmission channel, so that the preset server performs live streaming display according to the video frames.

According to the second aspect, the present disclosure provides an unmanned aerial vehicle-based live video streaming system, including:

a data receiving module, configured to acquire original video stream data sent by an unmanned aerial vehicle;

an encoding/decoding module, configured to encode/decode the original video stream data to obtain output buffer data;

a data conversion module, configured to convert the output buffer data into video frames supported by the WebRtc protocol; and a WebRtc transmission module, configured to send the video frames to a preset server through a WebRtc transmission channel, so that the preset server performs live streaming display according to the video frames.

According to the third aspect, the present disclosure provides an electronic device, including a memory and a processor, where the memory stores a computer program capable of being run on the processor, and when executing the computer program, the processor implements the unmanned aerial vehicle-based live video streaming method provided by any embodiment of the present disclosure.

According to the fourth aspect, the present disclosure provides a computer readable storage medium, where the storage medium stores a computer program, the computer program includes a program instruction, and the program instruction, when executed, implements the unmanned aerial vehicle-based live video streaming method provided by any embodiment of the present disclosure.

BRIEF DESCRIPTION OF THE DRAWINGS

To describe the technical solutions in embodiments of this application or in existing technologies more clearly, the accompanying drawings required for describing the embodiments or existing technologies are briefly described below. Apparently, the accompanying drawings in the following description show some embodiments of this application, and a person of ordinary skill in the art may still derive other drawings from these accompanying drawings without creative efforts.

FIG. 1 is a flowchart of an unmanned aerial vehicle-based live video streaming method provided by embodiment I of the present disclosure.

FIG. 2 is a sub-flowchart of an unmanned aerial vehicle-based live video streaming method provided by embodiment I of the present disclosure.

FIG. 3 is a sub-flowchart of an unmanned aerial vehicle-based live video streaming method provided by embodiment I of the present disclosure.

DETAILED DESCRIPTION

Figures 4, 5:
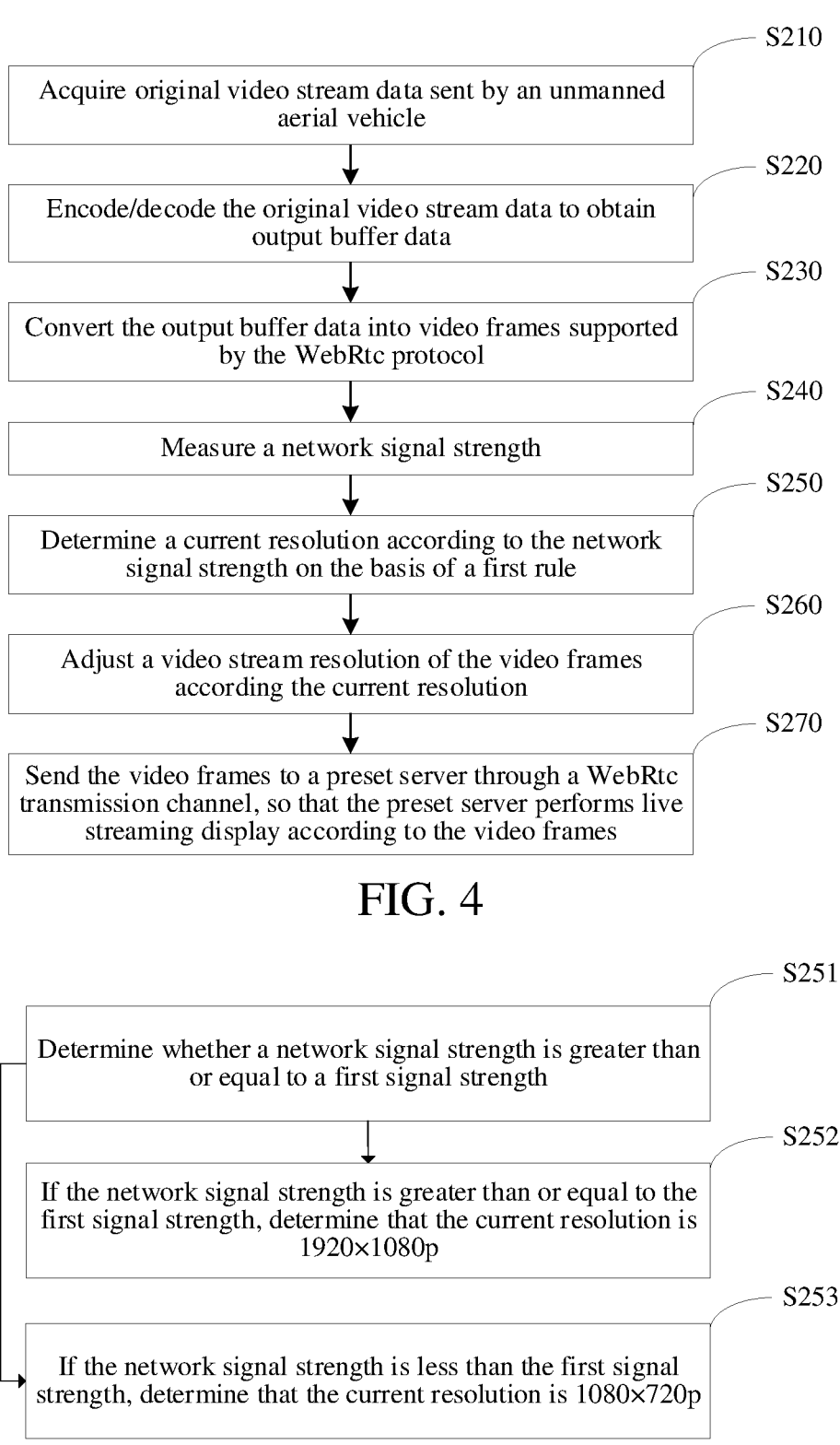
FIG. 4 is a flowchart of an unmanned aerial vehicle-based live video streaming method provided by embodiment II of the present disclosure.
FIG. 5 is a sub-flowchart of an unmanned aerial vehicle-based live video streaming method provided by embodiment II of the present disclosure.

The following clearly and completely describes the technical solutions in embodiments of this application with reference to the accompanying drawings in the embodiments of this application. It can be understood that the specific embodiments described here are only some embodiments rather than all the embodiments of this application, are only used to explain this application, but are not intended to limit this application. Moreover, it should also be noted that all other embodiments obtained by a person of ordinary skill in the art based on the embodiments of this application without creative efforts shall fall within the scope of protection of this application.

Unless otherwise defined, meanings of all technical and scientific terms used in the present disclosure are the same as those usually understood by a person skilled in the art to which the present disclosure belongs. Terms used in the specification of the present disclosure are merely intended to describe objectives of the specific embodiments, and are not intended to limit the present disclosure. A term "and/or" used in this specification includes any or all combinations of one or more related listed items.

In addition, terms "first" and "second" may be used in the specification to describe various directions, actions, steps or elements. However, these directions, actions, steps or elements are not limited by these terms. These terms are merely used to distinguish a first direction, action, step or element from another direction, action, step or element. For example, without departing from the scope of the present disclosure, a first use case may be referred to as a second use case, and similarly, a second use case may be referred to as a first use case. The first use case and the second use case are both use cases, but they are not the same use case. The terms "first" and "second" shall not be understood as an indication or implication of relative importance or implicit indication of the quantity of indicated technical features. Therefore, a feature limited by "first" or "second" may explicitly or implicitly include one or more of features. In the descriptions of the present disclosure, unless otherwise explicitly specified, "multiple" means at least two, for example, two or three. It should be noted that when one component is expressed as "being fixed" to another component, the one component may be directly on the another component, or there may also be an intermediate component. When one component is expressed as "being connected" to another component, the one component may be directly connected to the another component, or there may also be an intermediate component. Terms "vertical", "horizontal", "left", "right", and similar expressions used in the specification are for illustrative purposes only and do not represent any unique implementation.

Before more detailed discussion of example embodiments, it should be mentioned that some example embodiments are described as processes or methods depicted as flowcharts. Although flowcharts depict steps as a sequential process, many of the steps may be performed in parallel, concurrently, or simultaneously. Additionally, the order of steps can be rearranged. A process may be terminated when its operations are completed, but the process may also have additional steps not included in the figures. A process may correspond to a method, function, procedure, subroutine, subprogram or the like.

Embodiment I

Referring to FIG. 1, this embodiment provides an unmanned aerial vehicle-based live video streaming method. The method can be applied to an unmanned aerial vehicle system. The system includes an unmanned aerial vehicle, a terminal, and a preset server. The unmanned aerial vehicle is an unmanned aircraft having a task load and controlled by a remote control device or a self-provided program control apparatus. The terminal is an electronic device connected to the remote control device. The terminal maintains communication with the unmanned aerial vehicle through the remote control device and is used for data transmission relay between the unmanned aerial vehicle and the preset server. The terminal is usually a mobile phone, a tablet or the like. The preset server maintains communicative connection with the terminal. The unmanned aerial vehicle-based live video streaming method provided by this embodiment may be specifically executed by the unmanned aerial vehicle or the terminal, or may be executed by interaction between the terminal and the unmanned aerial vehicle. This embodiment is described in detail by taking execution by the terminal as an example. As shown in FIG. 1, the method includes the following steps.

At S110, original video stream data sent by the unmanned aerial vehicle is acquired.

In this embodiment, a flight control module and an image acquisition module are provided on the unmanned aerial vehicle. The flight control module is configured to monitor and control flight and tasks of the unmanned aerial vehicle, and the image acquisition module is configured to perform image acquisition in a flight process of the unmanned aerial vehicle. The original video stream data is data acquired by the image acquisition module and transmitted to the terminal.

Specifically, in this embodiment, the image acquisition module and the remote control device are connected through a dedicated communication link (usually a radio communication link established through an antenna of the remote control device and the unmanned aerial vehicle). Data acquired by the image acquisition module is first transmitted by the unmanned aerial vehicle to the remote control device, and then transmitted by the remote control device to the terminal. The original video stream data finally acquired by the terminal is usually H264 data. In some alternative embodiments, the original video stream data can also be in other data formats, which is not limited here.

At S120, the original video stream data is encoded/decoded to obtain output buffer data.

The output buffer data is a special encapsulation of the original video stream data by a multimedia codec, and thus in a subsequent process, the output buffer data can be further converted into special data that can be transmitted through a WebRtc transmission channel (that is, video frames supported by the WebRtc protocol referred to below). Different from existing technologies, in this embodiment, during unmanned aerial vehicle-based live video streaming, the WebRtc protocol is used as a data transmission protocol between the terminal and the preset server, such that real-time communication can become a standard function through a simple JavaScript API, without installing any plug-ins, and there will be no problem of lagging of live streaming due to the fact that one message fails and then causes all messages failing. However, in existing technologies, when the WebRtc protocol is applied, a picture collected by a camera is directly processed and transmitted. In this embodiment, a picture collected by the unmanned aerial vehicle needs to be transmitted to the terminal through a dedicated communication link, the terminal acquires the original video stream data, but the original video stream data cannot be directly transmitted through the WebRtc protocol. Therefore, in this embodiment, the original video stream data needs to be encoded and decoded to obtain data that conforms to the WebRtc protocol. Specifically, the encoding/decoding of the original video stream data in step S120 actually relates to converting the original video stream data into high-efficiency processed byte encapsulated data, that is, the output buffer data. When underlying video stream encoding is performed on the original video stream data to make same conform to the WebRtc protocol, bytes are processed, in which case if operation is performed solely with the help of a byte array, first, there will be a big problem with efficiency, and second, the biggest problem in use of an array is an out-of-bound exception and other information, and therefore, the high-efficiency processed byte encapsulation is used. Moreover, because the data still needs to be further processed in the subsequent process, after the data is processed by the codec, the output buffer data is stored in an output buffer for subsequent use.

Specifically, in some embodiments, when the terminal is an Android mobile phone or tablet device, taking the original video stream data including the H264 data as an example, a specific encoding/decoding process is as shown in FIG. 2, including steps S121 and S122.

At S121, the H264 data is written into a codec input buffer and submitted to the codec.

In this embodiment, the codec is a codec provided by MediaCodec. MediaCodec is a part of an Android low-level multimedia architecture, is usually used in combination with MediaExtractor, MediaMuxer, and AudioTrack, and can encode/decode common audio and video formats such as H.264, H.265, AAC, and 3gp.

At S122, the H264 data is encoded/decoded by the codec to generate ByteBuffer video stream data and the ByteBuffer video stream data is written into the codec output buffer.

Specifically, in the encoding/decoding process, MediaCodec uses a set of input and output buffers to process data synchronously or asynchronously. First, the terminal writes data to be encoded/decoded (that is, the original video stream data) into the obtained codec input buffer and submits the data to the codec, and after the data is processed by the codec, the ByteBuffer video stream data is generated and then transferred to the codec output buffer, and the client's ownership to the input buffer is taken back at the same time. Then, the terminal reads the encoded data from the obtained codec output buffer for processing (not the content in step S122), and after the processing is completed, the codec takes back the client's ownership to the output buffer.

At S130, the output buffer data is converted into the video frames supported by the WebRtc protocol.

The video frames are VideoFrame data objects supported by the WebRtc protocol, which can be pushed through a push interface provided by WebRtc. The output buffer data obtained in step S120 can only achieve efficient data processing, but still cannot be directly transmitted through the WebRtc protocol, and thus is further converted by step S130: the terminal continuously reads the output buffer data from the codec output buffer for conversion, so as to obtain the video frames that can be transmitted through the WebRtc protocol.

Specifically, continuing to take the above example of using the Android mobile phone or tablet device as the terminal as an example, in some embodiments, a conversion process of the output buffer data, i.e., step S130, includes steps S131 and S132, as shown in FIG. 3.

At S131, the ByteBuffer video stream data is read from the codec output buffer.

At S132, decoding and data conversion is performed on the basis of the ByteBuffer video stream data to obtain VideoFrame data.

As mentioned above, the ByteBuffer video stream data is generated and then directly written into the codec output buffer. During live streaming display of the unmanned aerial vehicle system, the terminal continuously reads the ByteBuffer video stream data from the codec output buffer, configures the video stream to be decoded to obtain the width, height, timestamp and other information of each frame of image, and performs encapsulation to form the VideoFrame data.

At S140, the video frames are sent to the preset server through the WebRtc transmission channel, so that the preset server performs live streaming display according to the video frames.

The WebRtc transmission channel is a data path between two devices connected by the push interface provided by WebRtc. In this embodiment, the push interface provided by WebRtc connects the terminal and the preset server. The WebRtc transmission channel is actually implemented through signals of a network, such as a 4G network. Specifically, after the video frames supported by the WebRtc protocol are obtained, the terminal can transmit the video frames to the preset server through the WebRtc transmission channel, and then the preset server receives the video frames and displays same in a live video streaming form.

In some specific embodiments, the WebRtc transmission channel includes a RTCPeerConnection channel and/or a RTCDataChannel channel. The RTCPeerConnection channel is a data path constructed by RTCPeerConnetion API and can achieve efficient and stable data stream communication. The RTCDataChannel is a data path constructed by RTC-DataChannel API and can achieve low-delay and high-throughout peer-to-peer data exchange.

Optionally, in some embodiments, the original video stream data includes H264 data, and the encoding/decoding the original video stream data to obtain output buffer data includes: writing the H264 data into a codec input buffer and submitting the H264 data to a codec; and encoding/decoding, by the codec, the H264 data to generate ByteBuffer video stream data and writing same into a codec output buffer.

Optionally, in some embodiments, the converting the output buffer data into video frames supported by the WebRtc protocol includes:

reading the ByteBuffer video stream data from the codec output buffer; and performing decoding and data conversion on the basis of the ByteBuffer video stream data to obtain VideoFrame data.

Optionally, in some embodiments, before the sending the video frames to a preset server through a WebRtc transmission channel, the method further includes:

measuring a network signal strength;

determining a current resolution according to the network signal strength on the basis of a first rule; and adjusting a video stream resolution of the video frames according to the current resolution.

Optionally, in some embodiments, the determining a current resolution according to the network signal strength on the basis of a first rule includes:

determining whether the network signal strength is greater than or equal to a first signal strength;

if the network signal strength is greater than or equal to the first signal strength, determining that the current resolution is 1920×1080p; and if the network signal strength is less than the first signal strength, determining that the current resolution is 1080×720p.

Optionally, in some embodiments, before the acquiring original video stream data sent by an unmanned aerial vehicle, the method further includes:

measuring a network signal strength;

determining a video stream bit rate according to the network signal strength on the basis of a second rule; and sending the video stream bit rate to the unmanned aerial vehicle, so that the unmanned aerial vehicle sends the original video stream data on the basis of the video stream bit rate.

Optionally, in some embodiments, the WebRtc transmission channel includes a RTCPeerConnection channel and/or a RTCDataChannel channel.

The unmanned aerial vehicle-based live video streaming method provided in this embodiment is applied to a terminal in communication with an unmanned aerial vehicle. First, original video stream data sent by the unmanned aerial vehicle is acquired, then the original video stream data is encoded/decoded to obtain output buffer data, data conversion is performed on the output buffer data to obtain video frames supported by the WebRtc protocol, and finally, the video frames are sent to a preset server through a WebRtc transmission channel, so that the preset server performs live streaming display according to the video frames. According to the method, in an unmanned aerial vehicle-based live streaming process, a terminal is used to implement real-time live streaming based on the WebRtc protocol, so that delay of a live streaming picture is greatly reduced; in practical application, the unmanned aerial vehicle-based live video streaming method provided in this embodiment achieves a live streaming picture delay of less than 200 ms during preview through a public network, while the unmanned aerial vehicle live streaming delays of conventional technologies are all 1s or longer; in this embodiment, a WebRtc conversion apparatus and a network communication apparatus are not required to be installed on the unmanned aerial vehicle, so that the hardware cost of the unmanned aerial vehicle is reduced; the computing performance of the terminal also far exceeds the computing power requirements for data conversion in the unmanned aerial vehicle-based live streaming process; and the underlying architecture of terminal-based data conversion is mature, easy to implement, and low in development cost, existing unmanned aerial vehicle systems can be modified through only software modification, and the application scenarios are wide.

Embodiment provides an unmanned aerial vehicle-based live video streaming method, which can be implemented on the basis of Embodiment I. Some contents in Embodiment I are specifically supplemented or illustrated by examples. For example, a process of performing resolution adjustment according to a network signal strength is provided, specifically including the following steps.

As shown in FIG. 4, the unmanned aerial vehicle-based live video streaming method provided in this embodiment includes the following steps.

At S210, original video stream data sent by an unmanned aerial vehicle is acquired.

At S220, the original video stream data is encoded/decoded to obtain output buffer data.

At S230, the output buffer data is converted into video frames supported by the WebRtc protocol.

At S240, a network signal strength is measured.

The network signal strength represents the network signal strength currently used by a terminal to connect a preset server. For example, when the terminal can currently use a 4G network and a 5G network, but the terminal and the preset server are connected through the 4G network, the network signal strength represents the current 4G signal strength of the terminal.

At S250, a current resolution is determined according to the network signal strength on the basis of a first rule.

The current resolution represents the resolution of a live streaming image in a video frame, and is a resolution value that can be adaptively adjusted according to the network signal strength, so as to ensure that the data transmission rate will not make live streaming delayed. It can be understood that when the network signal strength is low, the data transmission rate is slow. The data volume of a live streaming image having a high resolution is necessarily larger than the data volume of a live streaming image having a low resolution, and thus untimely data transmission will inevitably lead to highly delayed live streaming. Therefore, in this embodiment, the first rule for adjusting the current resolution according to the network signal strength is set, and on the basis of the first rule, a resolution value matching the network signal strength can be automatically selected as the current resolution according to the network signal strength.

In one specific embodiment, step S250 shown in FIG. 5 specifically includes steps S251-253.

At S251, whether the network signal strength is greater than or equal to a first signal strength is determined.

At S252, if the network signal strength is greater than or equal to the first signal strength, it is determined that the current resolution is 1920×1080p.

At S253, if the network signal strength is less than the first signal strength, it is determined that the current resolution is 1080×720p.

Steps S251-253 are only a specific example of determining the current resolution. The first signal strength is a specific signal strength value, such as −67 dBm, and can be set according to actual needs, which is not limited in this embodiment. FIG. 5 only shows the process of adjustment between two resolution values according to the first signal strength. However, in actual application, a second signal strength and a third signal strength can also be set. In addition to 1080p (1920×1080p) and 720p (1080×720p), the current resolution can also be set as resolution values such as 360p and 4k. Of course, in some embodiments, to ensure display clarity, 720p is usually the lowest resolution.

At S260, a video stream resolution of the video frames is adjusted according to the current resolution.

The video stream resolution is a parameter of the video frames and is used for determining the resolution of an image that can be generated according to the video frames. After the current resolution is determined, the terminal adjusts the video stream resolution of the video frames according to the current resolution, which actually relates to adjusting the finally transmitted data volume.

At S270, the video frames are sent to the preset server through a WebRtc transmission channel, so that the preset server performs live streaming display according to the video frames.

Figure 6:
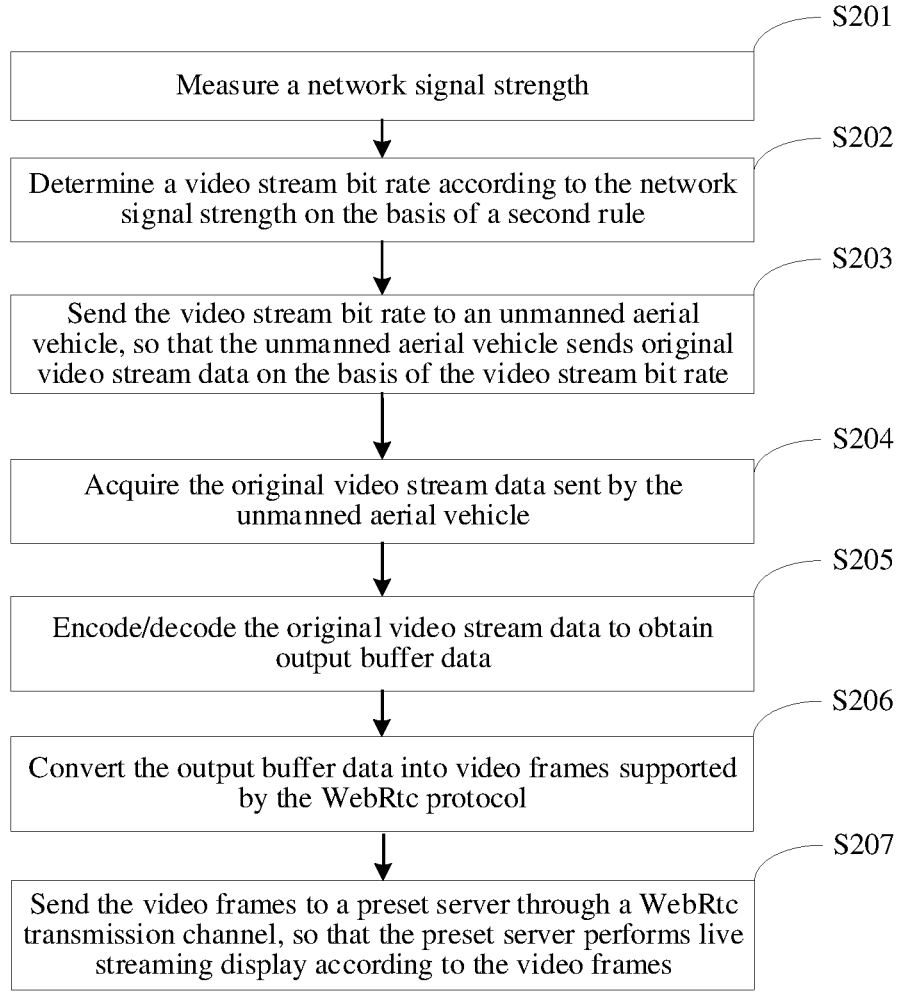
FIG. 6 is a flowchart of an unmanned aerial vehicle-based live video streaming method provided by embodiment II of the present disclosure.

More specifically, in some embodiments, as shown in FIG. 6, a process of performing bit rate adjustment on the original video stream data according to the network signal strength is further included.

At S201, a network signal strength is measured.

Similar to step S240, the network signal strength represents the network signal strength currently used by the terminal to connect to the preset server.

At S202, a video stream bit rate is determined according to the network signal strength on the basis of a second rule.

The second rule is a rule for increasing or decreasing the video stream bit rate according to the increase or decrease of the network signal strength. In this embodiment, the video stream bit rate increases as the network signal strength increases. In some specific embodiments, the second rule may be a direct proportion relation expression which takes the network signal strength and the video stream bit rate as relevant quantities and indicates that there is a proportional relation between the network signal strength and the video stream bit rate. The video stream bit rate is used for representing the image clarity during image transmission between the unmanned aerial vehicle and the terminal, changes as the network signal strength changes, is a constantly fluctuating value, and determines the data volume of the original video stream data. It can be understood that the larger the data volume of the original video stream data, the more time it takes for the terminal to process conversion. Moreover, when the network signal strength is relatively low, it is further required to adjust the resolution during conversion into the video frames, such that the processing time is further increased. Therefore, in this embodiment, the video stream bit rate during image transmission between the unmanned aerial vehicle and the terminal is further automatically adjusted according to the network signal strength, so as to reduce the overall live streaming delay.

At S203, the video stream bit rate is sent to the unmanned aerial vehicle, so that the unmanned aerial vehicle sends the original video stream data on the basis of the video stream bit rate.

After determining the current suitable video stream bit rate according to the network signal strength, the terminal sends this information to the unmanned aerial vehicle, and the unmanned aerial vehicle then transmits the original video stream data to the terminal according to the video stream bit rate.

At S204, the original video stream data sent by the unmanned aerial vehicle is acquired.

At S205, the original video stream data is encoded/decoded to obtain output buffer data.

At S206, the output buffer data is converted into video frames supported by the WebRtc protocol.

At S207, the video frames are sent to the preset server through a WebRtc transmission channel, so that the preset server performs live streaming display according to the video frames.

This embodiment further provides a process of adjusting the video stream resolution of the video frames according to the network signal strength, and a process of adjusting the video stream bit rate of the original video stream data, so that the video stream resolution and the video stream bit rate are adapted for the network signal strength, thereby avoiding the live streaming delay caused by mismatching between the data volume and the data transmission rate.

Figure 7:
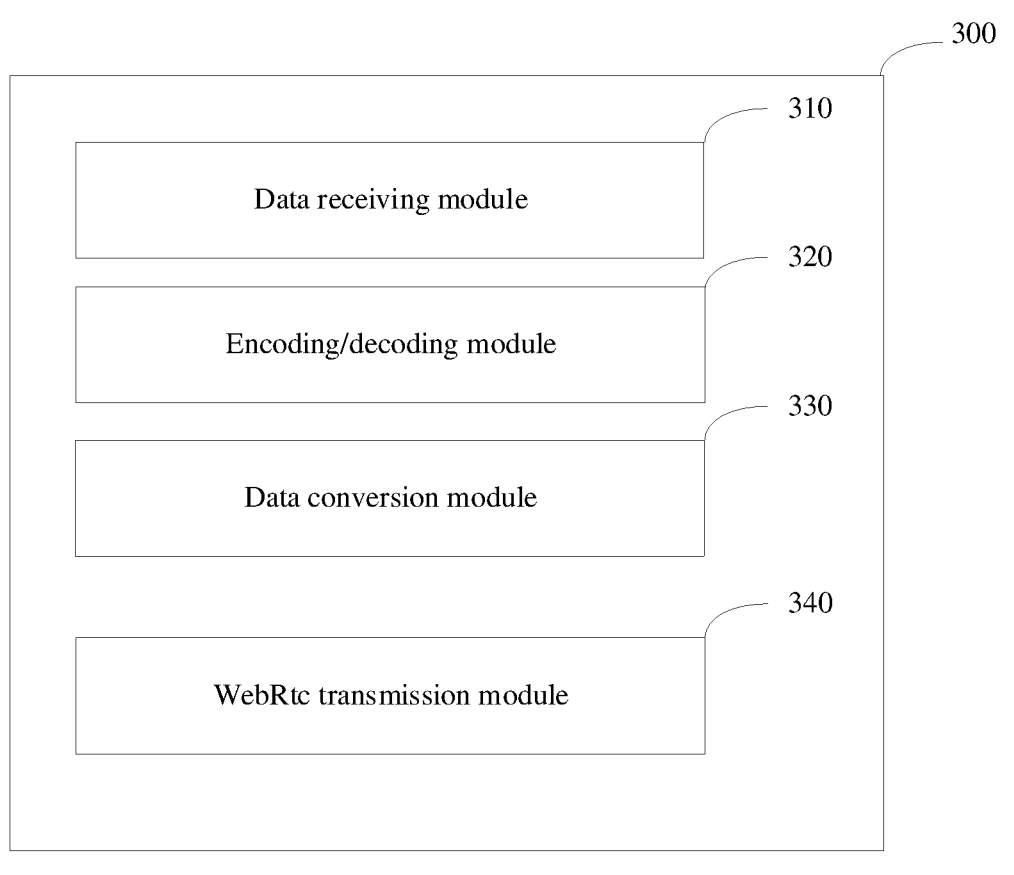
FIG. 7 is a schematic diagram of the structure of an unmanned aerial vehicle-based live video streaming system provided by embodiment III of the present disclosure.

FIG. 7 is a schematic diagram of the structure of an unmanned aerial vehicle-based live video streaming system 300 provided by embodiment of the present disclosure. As shown in FIG. 7, the system 300 includes:

a data receiving module 310, configured to acquire original video stream data sent by an unmanned aerial vehicle;

an encoding/decoding module 320, configured to encode/ decode the original video stream data to obtain output buffer data;

a data conversion module 330, configured to convert the output buffer data into video frames supported by the WebRtc protocol; and a WebRtc transmission module 340, configured to send the video frames to a preset server through a WebRtc transmission channel, so that the preset server performs live streaming display according to the video frames.

Optionally, in some embodiments, the original video stream data includes H264 data, and the encoding/decoding module 320 is specifically configured to:

write the H264 data into a codec input buffer and submit the H264 data to a codec; and encode/decode, by the codec, the H264 data to generate ByteBuffer video stream data and write same into a codec output buffer.

Optionally, in some embodiments, the data conversion module 330 is specifically configured to:

read the ByteBuffer video stream data from the codec output buffer; and perform decoding and data conversion on the basis of the ByteBuffer video stream data to obtain VideoFrame data.

Optionally, in some embodiments, the system further includes:

a network measurement module, configured to measure a network signal strength;

a resolution determination module, configured to determine a current resolution according to the network signal strength on the basis of a first rule; and a video frame adjustment module, configured to adjust a video stream resolution of the video frames according to the current resolution.

Optionally, in some embodiments, the resolution determination module is specifically configured to:

determine whether the network signal strength is greater than or equal to a first signal strength;

if the network signal strength is greater than or equal to the first signal strength, determine that the current resolution is 1920×1080p; and if the network signal strength is less than the first signal strength, determine that the current resolution is 1080× 720p.

Optionally, in some embodiments, the system includes:

a network measurement module, configured to measure a network signal strength;

a bit rate determination module, configured to determine a video stream bit rate according to the network signal strength on the basis of a second rule; and a bit rate adjustment module, configured to send the video stream bit rate to the unmanned aerial vehicle, so that the unmanned aerial vehicle sends the original video stream data on the basis of the video stream bit rate.

Optionally, in some embodiments, the WebRtc transmission channel includes a RTCPeerConnection channel and/or a RTCDataChannel channel.

This embodiment provides an unmanned aerial vehicle-based live video streaming system, applied to a terminal in communication with an unmanned aerial vehicle. First, original video stream data sent by the unmanned aerial vehicle is acquired, then the original video stream data is encoded/decoded to obtain output buffer data, data conversion is performed on the output buffer data to obtain video frames supported by the WebRtc protocol, and finally, the video frames are sent to a preset server through a WebRtc transmission channel, so that the preset server performs live streaming display according to the video frames. According to the method, in an unmanned aerial vehicle-based live streaming process, a terminal is used to implement real-time live streaming based on the WebRtc protocol, so that delay of a live streaming picture is greatly reduced; a WebRtc conversion apparatus and a network communication apparatus are not required to be installed on the unmanned aerial vehicle, so that the hardware cost of the unmanned aerial vehicle is reduced; the computing performance of the terminal also far exceeds the computing power requirements for data conversion in the unmanned aerial vehicle-based live streaming process; and the underlying architecture of terminal-based data conversion is mature, easy to implement, and low in development cost, existing unmanned aerial vehicle systems can be modified through only software modification, and the application scenarios are wide.

Figure 8:
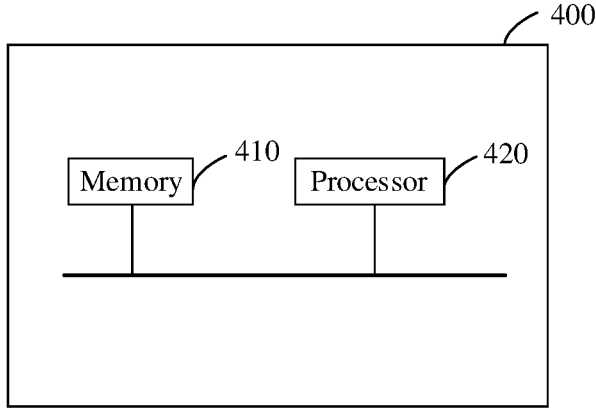
FIG. 8 is a schematic diagram of the structure of an electronic device provided by embodiment IV of the present disclosure.

FIG. 8 is a schematic diagram of the structure of an electronic device 400 capable of implementing the unmanned aerial vehicle-based live video streaming method provided by embodiment of the present disclosure. As shown in FIG. 8, the device includes a memory 410 and a processor 420. One or more processors 420 may be provided. In FIG. 8, the case of one processor 420 is taken as an example. The memory 410 and the processor 420 in the device can be connected through a bus or other means. In FIG. 8, the connection through a bus is taken as an example.

As a computer-readable storage medium, the memory 410 can be used to store software programs, computer-executable programs and modules, such as program instructions/modules corresponding to the unmanned aerial vehicle-based live video streaming method in the embodiments of the present disclosure (for example, the data receiving module 310, the encoding/decoding module 320, the data conversion module 330, and the WebRtc transmission module 340 in the unmanned aerial vehicle-based live video streaming system). The processor 420 executes various functional applications and data processing of the modules of the unmanned aerial vehicle-based live video streaming system by running the software programs, instructions and modules stored in the memory 410, to implement the unmanned aerial vehicle-based live video streaming method.

The processor 420 is configured to run the computer-executable program stored in the memory 410 to implement the following steps: S110, acquiring original video stream data sent by an unmanned aerial vehicle; S120, encoding/decoding the original video stream data to obtain output buffer data; S130, converting the output buffer data into video frames supported by the WebRtc protocol; and S140, sending the video frames to a preset server through a WebRtc transmission channel, so that the preset server performs live streaming display according to the video frames.

Of course, the embodiments of the present disclosure provide an unmanned aerial vehicle-based live video streaming apparatus. The apparatus is not limited to the method operations above, and can also execute the relevant operations in the unmanned aerial vehicle-based live video streaming method provided by any embodiment of the present disclosure.

The memory 410 may mainly include a program storage area and a data storage area. The program storage area can store operating systems, and an application program required by at least one function. The data storage area can store data created according to the use of the terminal and the like. In addition, the memory 410 may include a high-speed random access memory, and may also include a non-volatile memory, such as at least one disk storage device, a flash memory, or another non-volatile solid-state storage device. In some embodiments, the memory 410 may further include memories remotely disposed relative to the processor 420, and these remote memories may be connected to the device through a network. Examples of the network include, but are not limited to, the Internet, an intranet, a local area network, a mobile communication network, and a combination thereof.

Embodiment of the present disclosure provides a storage medium including a computer-executable instruction. When executed by a computer processor, the computer-executable instruction is used to execute the unmanned aerial vehicle-based live video streaming method. The unmanned aerial vehicle-based live video streaming method includes:

> acquiring original video stream data sent by an unmanned aerial vehicle;
> encoding/decoding the original video stream data to obtain output buffer data;
> converting the output buffer data into video frames supported by the WebRtc protocol; and
> sending the video frames to a preset server through a WebRtc transmission channel, so that the preset server performs live streaming display according to the video frames.

Of course, the embodiments of the present disclosure provide a storage medium including a computer-executable instruction, where the computer-executable instruction is not limited to the method operations above, and can also execute the relevant operations in the unmanned aerial vehicle-based live video streaming method provided by any embodiment of the present disclosure.

According to the descriptions in the foregoing implementations, a person skilled in the art may clearly know that the present disclosure may be implemented by relying on software and necessary general-purpose hardware, and of course, may also be implemented by hardware, but in many cases, the former relates to better implementations. Based on such an understanding, the technical solutions of the present disclosure essentially, or the part contributing to the existing technologies, may be implemented in the form of a software product. The computer software product may be stored in a computer-readable storage medium, such as a floppy disk, a read-only memory (ROM), a random access memory (RAM), a flash memory (FLASH), a hard disk, or an optical disc of a computer, and includes several instructions for instructing an electrode device (which may be a personal computer, a device, a network device, or the like) to execute the methods described in the embodiments of the present disclosure.

Compared with existing technologies, the unmanned aerial vehicle-based live video streaming method provided in the embodiments of the present disclosure is applied to a terminal in communication with an unmanned aerial vehicle. First, original video stream data sent by the unmanned aerial vehicle is acquired, then the original video stream data is encoded/decoded to obtain output buffer data, data conversion is performed on the output buffer data to obtain video frames supported by the WebRtc protocol, and finally, the video frames are sent to a preset server through a WebRtc transmission channel, so that the preset server performs live streaming display according to the video frames. According to the method, in an unmanned aerial vehicle-based live streaming process, a terminal is used to implement real-time live streaming based on the WebRtc protocol, so that delay of a live streaming picture is greatly reduced; a WebRtc conversion apparatus and a network communication apparatus are not required to be installed on the unmanned aerial vehicle, so that the hardware cost of the unmanned aerial vehicle is reduced; the computing performance of the terminal also far exceeds the computing power requirements for data conversion in the unmanned aerial vehicle-based live streaming process; and the underlying architecture of terminal-based data conversion is mature, easy to implement, and low in development cost, existing unmanned aerial vehicle systems can be modified through only software modification, and the application scenarios are wide.

It should be noted that in the foregoing embodiments of the authorized system, the various units and modules included are only obtained by division according to functional logic, but the system is not limited to said division, as long as the corresponding functions can be achieved. In addition, the specific names of the functional units are merely for the convenience of distinguishing each other, but are not intended to limit the scope of protection of the present disclosure.

It should be noted that the above are only the preferred embodiments of the present disclosure and the technical principles used. A person skilled in the art would understand that the present disclosure is not limited to the specific embodiments described herein, and various obvious changes, readjustments and substitutions can be made by a person skilled in the art without departing from the scope of protection of the present disclosure. Therefore, although the present disclosure has been described in detail through the foregoing embodiments, the present disclosure is not limited to the foregoing embodiments. Without departing from the concept of the present disclosure, the present disclosure can also include more other equivalent embodiments, and the scope of the present disclosure is determined by the scope of the appended claims.

What is claimed is:

1. An unmanned aerial vehicle-based live video streaming method, comprising:
    measuring a network signal strength of a network over which a terminal is currently communicating with a preset server;
    determining a video stream bit rate according to the network signal strength on the basis of a second rule, the second rule being a rule for increasing or decreasing the video stream bit rate according to the increase or decrease of the network signal strength;
    sending the video stream bit rate to an unmanned aerial vehicle, the video stream bit rate representing an image clarity during image transmission between the unmanned aerial vehicle and the terminal;
    the terminal acquiring original video stream data sent by the unmanned aerial vehicle at the video stream bit rate;
    the terminal encoding/decoding the original video stream data to obtain output buffer data;
    the terminal converting the output buffer data into video frames supported by the WebRtc protocol; and the terminal sending the video frames to the preset server through a WebRtc transmission channel, so that the preset server performs live streaming display according to the video frames.

2. The unmanned aerial vehicle-based live video streaming method according to claim 1, wherein the original video stream data comprises H264 data, and the terminal encoding/decoding the original video stream data to obtain output buffer data comprises:
    writing the H264 data into a codec input buffer and submitting the H264 data to a codec; and
    encoding/decoding, by the codec, the H264 data to generate ByteBuffer video stream data and write the ByteBuffer video stream data into a codec output buffer.

3. The unmanned aerial vehicle-based live video streaming method according to claim 2, wherein the terminal converting the output buffer data into video frames supported by the WebRtc protocol comprises:
    reading the ByteBuffer video stream data from the codec output buffer; and
    performing decoding and data conversion on the basis of the ByteBuffer video stream data to obtain VideoFrame data.

4. The unmanned aerial vehicle-based live video streaming method according to claim 1, wherein before the terminal sending the video frames to the preset server through the WebRtc transmission channel, the method further comprises:
    determining a current resolution according to the network signal strength on the basis of a first rule; and
    adjusting a video stream resolution of the video frames according to the current resolution.

5. The unmanned aerial vehicle-based live video streaming method according to claim 4, wherein the determining the current resolution according to the network signal strength on the basis of the first rule comprises:
    determining whether the network signal strength is greater than or equal to a first signal strength;
    when the network signal strength is greater than or equal to the first signal strength, determining that the current resolution is 1920×1080p; and
    when the network signal strength is less than the first signal strength, determining that the current resolution is 1080×720p.

6. The unmanned aerial vehicle-based live video streaming method according to claim 1, wherein the WebRtc transmission channel comprises a RTCPeerConnection channel.

7. The unmanned aerial vehicle-based live video streaming method according to claim 1, wherein the WebRtc transmission channel comprises a RTCDataChannel channel.

8. An unmanned aerial vehicle-based live video streaming system, comprising:
    a network measurement module, configured to measure a network signal strength of a network over which a terminal is currently communicating with a preset server;
    a bit rate determination module, configured to determine a video stream bit rate according to the network signal strength on the basis of a second rule, the second rule being a rule for increasing or decreasing the video stream bit rate according to the increase or decrease of the network signal strength; and
    a bit rate adjustment module, configured to send the video stream bit rate to an unmanned aerial vehicle, the video stream bit rate representing an image clarity during image transmission between the unmanned aerial vehicle and the terminal;

a data receiving module, configured to acquire original video stream data sent by the unmanned aerial vehicle at the video stream bit rate;

an encoding/decoding module, configured to encode/decode the original video stream data to obtain output buffer data;

a data conversion module, configured to convert the output buffer data into video frames supported by the WebRtc protocol; and a WebRtc transmission module, configured to send the video frames to the preset server through a WebRtc transmission channel, so that the preset server performs live streaming display according to the video frames.

9. The unmanned aerial vehicle-based live video streaming system according to claim 8, wherein the original video stream data comprises H264 data, and the encoding/decoding module further configure to:

write the H264 data into a codec input buffer and submit the H264 data to a codec; and encode/decode, by the codec, the H264 data to generate ByteBuffer video stream data and write the ByteBuffer video stream data into a codec output buffer.

10. The unmanned aerial vehicle-based live video streaming system according to claim 9, wherein the data conversion module further configure to:

read the ByteBuffer video stream data from the codec output buffer; and perform decoding and data conversion on the basis of the ByteBuffer video stream data to obtain VideoFrame data.

11. The unmanned aerial vehicle-based live video streaming system according to claim 8, comprising:

a resolution determination module, configured to determine a current resolution according to the network signal strength on the basis of a first rule; and a video frame adjustment module, configured to adjust a video stream resolution of the video frames according to the current resolution.

12. The unmanned aerial vehicle-based live video streaming system according to claim 11, the resolution determination module further configure to:

determine whether the network signal strength is greater than or equal to a first signal strength;

when the network signal strength is greater than or equal to the first signal strength, determine that the current resolution is 1920×1080p; and when the network signal strength is less than the first signal strength, determine that the current resolution is 1080×720p.

13. An electronic device, comprising a memory and a processor, wherein the memory stores a computer program, when executed by the processor, cause the processor to perform an unmanned aerial vehicle-based live video streaming method, comprising:

measuring a network signal strength of a network over which a terminal is currently communicating with a preset server;

determining a video stream bit rate according to the network signal strength on the basis of a second rule, the second rule being a rule for increasing or decreasing the video stream bit rate according to the increase or decrease of the network signal strength;

sending the video stream bit rate to an unmanned aerial vehicle, the video stream bit rate representing an image clarity during image transmission between the unmanned aerial vehicle and the terminal;

acquiring original video stream data sent by the unmanned aerial vehicle;

encoding/decoding the original video stream data to obtain output buffer data;

converting the output buffer data into video frames supported by the WebRtc protocol; and sending the video frames to the preset server through a WebRtc transmission channel, so that the preset server performs live streaming display according to the video frames.

14. The electronic device according to claim 13, wherein the original video stream data comprises H264 data, and the encoding/decoding the original video stream data to obtain output buffer data comprises:

writing the H264 data into a codec input buffer and submitting the H264 data to a codec; and encoding/decoding, by the codec, the H264 data to generate ByteBuffer video stream data and write the ByteBuffer video stream data into a codec output buffer.

15. The electronic device according to claim 14, wherein the converting the output buffer data into video frames supported by the WebRtc protocol comprises:

reading the ByteBuffer video stream data from the codec output buffer; and performing decoding and data conversion on the basis of the ByteBuffer video stream data to obtain VideoFrame data.

16. The electronic device according to claim 13, wherein before the sending the video frames to the preset server through the WebRtc transmission channel, the method further comprises:

determining a current resolution according to the network signal strength on the basis of a first rule; and adjusting a video stream resolution of the video frames according to the current resolution.

17. The electronic device according to claim 16, wherein the determining the current resolution according to the network signal strength on the basis of the first rule comprises:

determining whether the network signal strength is greater than or equal to a first signal strength;

when the network signal strength is greater than or equal to the first signal strength, determining that the current resolution is 1920×1080p; and when the network signal strength is less than the first signal strength, determining that the current resolution is 1080×720p.

18. The unmanned aerial vehicle-based live video streaming method according to claim 1, wherein the original video stream data is first transmitted by the unmanned aerial vehicle to a remote control device, and then transmitted by the remote control device to the terminal.

19. The unmanned aerial vehicle-based live video streaming system according to claim 8, wherein the original video stream data is first transmitted by the unmanned aerial vehicle to a remote control device, and then transmitted by the remote control device to the terminal.

20. The electronic device according to claim 13, wherein the original video stream data is first transmitted by the unmanned aerial vehicle to a remote control device, and then transmitted by the remote control device to the terminal.

* * * * *